United States Patent
Kuo et al.

(10) Patent No.: US 9,713,122 B2
(45) Date of Patent: Jul. 18, 2017

(54) METHOD AND APPARATUS OF MULTICAST CONTROL CHANNEL ACQUISITION IN WIRELESS COMMUNICATION SYSTEM

(75) Inventors: Richard Lee-Chee Kuo, Taipei (TW); Yu-Hsuan Guo, Taipei (TW)

(73) Assignee: INNOVATIVE SONIC CORPORATION, Taipei (TW)

( * ) Notice: Subject to any disclaimer, the term of this patent is extended or adjusted under 35 U.S.C. 154(b) by 1073 days.

(21) Appl. No.: 12/889,423

(22) Filed: Sep. 24, 2010

(65) Prior Publication Data

US 2011/0081854 A1 Apr. 7, 2011

Related U.S. Application Data

(60) Provisional application No. 61/247,577, filed on Oct. 1, 2009.

(51) Int. Cl.
  *H04H 20/71* (2008.01)
  *H04W 72/00* (2009.01)
  *H04W 68/00* (2009.01)

(52) U.S. Cl.
  CPC .......... *H04W 72/005* (2013.01); *H04W 68/00* (2013.01)

(58) Field of Classification Search
  CPC ... H04W 4/06; H04W 72/005; H04W 76/002; H04W 4/00; H04W 68/00; H04L 65/4076; H04L 5/0035
  See application file for complete search history.

(56) References Cited

U.S. PATENT DOCUMENTS

| | | | |
|---|---|---|---|
| 8,553,726 B2 * | 10/2013 | Lee et al. | 370/480 |
| 2006/0040655 A1 | 2/2006 | Kim | |
| 2009/0073909 A1 * | 3/2009 | Cai et al. | 370/312 |
| 2011/0077006 A1 * | 3/2011 | Hsu | H04W 36/08 455/436 |
| 2011/0194428 A1 * | 8/2011 | Wang et al. | 370/252 |

FOREIGN PATENT DOCUMENTS

| | | |
|---|---|---|
| EP | 1835671 A2 | 9/2007 |
| WO | 2009022825 A2 | 2/2009 |

OTHER PUBLICATIONS

3GPP TSG-RAN WG2 Meeting #67, Shenzhen, China, Aug. 24-28, 2009 (R2-094507).
3GPP TSG-RAN WG2 Meeting #67, Shenzhen, China, Aug. 24-28, 2009 (R2-094579).
3GPP TSG-RAN WG2 Meeting #67, Shenzhen, China, Aug. 24-28, 2009 (R2-095326).

(Continued)

*Primary Examiner* — Ankur Jain
(74) *Attorney, Agent, or Firm* — Blue Capital Law Firm, P.C.

(57) ABSTRACT

A method for Multicast Control Channel (MCCH) acquisition in a User Equipment (UE) of a wireless communication system is disclosed. The method includes receiving at least one MBMS service, expressing interest in reception of a new MBMS service, and deciding whether to monitor an MCCH notification according to whether the MBSFN area which broadcasts the new MBMS service is among the MBSFN areas in which the UE is receiving the at least one MBMS services.

22 Claims, 4 Drawing Sheets

(56) References Cited

OTHER PUBLICATIONS

Office Action on corresponding foreign application (CN 201010297921.0) dated Nov. 30, 2012.
LG Electronics Inc. : "Forward Compatibility for MCCH", 3GPP TSG-RAN WG2 #67, R2-094579. Aug. 24-28, 2009, pp. 1-3, XP050352696, Shenzhen, China.
Alcatel-Lucent Shanghai Bell, Alcatel-Lucent: "Notification mechanism design for eMBMS", 3GPP TSG-RAN WG2 #66, R2-093095, May 4-8, 2009, pp. 1/3-3/3, XP050340839. San Francisco, US.
ITRI: "MCCH Change Indicator for UEs Receiving a Session", 3GPP TSG-RAN WG2 Meeting #67, Tdoc R2-094897, Aug. 24-28, 2009, pp. 1-3, XP050352860, ShenZhen, China.
3GPP TSG-RAN2 Meeting #68bis, Jan. 18-22, 2010, Valencia, Spain (R2-100381).
Search Report on corresponding EP Patent Application No. 10012958.4 issued on Jan. 11, 2011.
3GPP TS 36.331 V8.6.0, "E-UTRA RRC Protocol specification (Release 8)", Jun. 2009.
3GPP TR 36.814 V0.4.1, "Further Advancements for E-UTRA Physical Layer Aspects (Release 9)", Feb. 2009.
3GPP, R2-094345, "Radio link failure considering carrier aggregation", Aug. 2009.
3GPP, R2-094218, "RLF Procedures for Carrier Aggregation", Aug. 2009.
3GPP, R2-094324, "Consideration on Radio Link Failure in CA", Aug. 2009.
3GPP TS 36.300 V9.1.0 "E-UTRA and E-UTRAN Overall Description Stage 2 (Release 9)", Sep. 2009.
Office Action on corresponding foreign application (TW 099132817) dated Jan. 23, 2014.

\* cited by examiner

METHOD AND APPARATUS OF MULTICAST CONTROL CHANNEL ACQUISITION IN WIRELESS COMMUNICATION SYSTEM

CROSS REFERENCE TO RELATED APPLICATIONS

This application claims the benefit of U.S. Provisional Application No. 61/247,577, filed on Oct. 1, 2009 and entitled "Method and apparatus for determining UE radio link status and MCCH acquisition in a wireless communication system", the contents of which are incorporated herein by reference.

BACKGROUND OF THE INVENTION

1. Field of the Invention

The present invention relates to a method and apparatus for Multicast Control Channel (MCCH) acquisition, and more particularly, to a method and apparatus capable of deciding whether to monitor an MCCH notification in a User Equipment (UE) of a wireless communication system according to whether the MBSFN area which broadcasts a new MBMS service is among the MBSFN areas in which the UE is receiving the MBMS services.

2. Description of the Prior Art

To enhance multimedia performance of the 3G mobile telecommunications system, the 3rd Generation Partnership Project (3GPP) introduces a Multimedia Broadcast Multicast Service (MBMS), which is a point-to-multipoint bearer service established on an existing network architecture of the Universal Mobile Telecommunications System (UMTS). MBMS allows a single source terminal to simultaneously transmit data to multiple user equipments (UEs) via Internet Protocol (IP) packets.

However, as the multimedia performance of mobile devices advances, consumers are more interested to have multimedia or mobile TV services via the mobile devices. In order to meet such requirement, the 3GPP introduces an enhanced MBMS (eMBMS) in a specification of long term evolution (LTE) Release-9, to support high quality streaming multimedia and real-time MBMS services.

The eMBMS introduces a single frequency network (SFN) operation for MBMS transmission, i.e. MBMS Single Frequency Network (MBSFN), to reduce service interruption due to frequency switching during transmissions. In MBSFN, single frequency is used by multiple cells to perform synchronized transmission at the same time, so as to save frequency resources and enhance spectrum utilization. An area covered by an MBSFN is called an MBSFN area.

In addition, only two logical channels are defined in eMBMS to support point-to-multipoint (p-t-m) downlink transmission: Multicast Control Channel (MCCH) and Multicast Traffic Channel (MTCH). MCCH is utilized for transmitting control messages of all MBMS services in an MBSFN area, and MTCH is utilized for transmitting session data of an MBMS service. The session data relates to contents of the MBMS service. Both MCCH and MTCH are mapped to a transmission channel newly defined by eMBMS, i.e. Multicast Channel (MCH).

In general, an MBSFN area has an MCCH. However, when an evolved Node B (eNB) is simultaneously covered by multiple MBSFN areas, the eNB may have multiple MCCHs. Besides, since an MBSFN area can simultaneously support multiple MBMS services, and different MBMS services may have different requirements, such as Quality of Service (QoS), Block Error Rate (BLER), according to different characteristics, an MBSFN area may have multiple MCHs. Different MCHs meet requirements of different MBMS services by applying different modulation and coding schemes. MCCH is mainly responsible for providing these MCHs with the control information. The MCCH structure is mainly governed by the following principles in LTE Release-9:

(1) The MCCH is sent on MCH.
(2) MCCH includes a Radio Resource Control (RRC) message which lists all the MBMS services with ongoing sessions.
(3) MCCH is transmitted at each repetition period.
(4) MCCH uses a modification period which is longer than a repetition period. The MCCH message of an MBSFN area remains the same during a modification period.
(5) A notification mechanism is used to announce changes of MCCH due to Session Start. An MCCH notification has the following features:

(a) An MCCH notification is transmitted with a Physical Downlink Control Channel (PDCCH) addressed to an MBMS radio network temporary identifier (M-RNTI).
(b) Timing for transmission of an MCCH notification is for further study (FFS), and can be based on paging occasion or special M-RNTI occasion.
(c) After receiving an MCCH notification, the UE acquires MCCH during the next modification period. In other words, since the MCCH message remains the same during a modification period, the UE should acquire MCCH changed due to Session Start during the next modification period after receiving an MCCH notification.

(6) The UE is informed of changes other than Session Start, such as Session Stop, PMCH reconfiguration, etc., by monitoring MCCH message at each modification period.

The principle (5) states that the MCCH notification mechanism is used to announce changes of MCCH due to Session Start, and (6) states that the UE needs to monitor MCCH message at each modification period, to acquire changes other than Session Start. (5) and (6) seem to imply that if a UE expresses interest in reception of a new MBMS service, the UE must monitor an MCCH notification to acquire an MCCH message about Session Start of the new MBMS service. For a UE which does not start receiving any MBMS service, the UE only needs to acquire MCCH at the next modification period after receiving the MCCH notification instead of frequently monitoring MCCH at each modification period, and thus can save power.

However, for a UE which is receiving MBMS services and expresses interest in reception of another new MBMS service, it is not absolutely necessary for the UE to receive an MCCH notification. Whether the UE needs to receive an MCCH notification mainly depends on whether the MBSFN area which broadcasts the new MBMS service is among the MBSFN areas in which the UE is receiving the MBMS services. If the MBSFN area which broadcasts the new MBMS service is among the MBSFN areas in which the UE is receiving the MBMS services, since the UE acquires the same MCCH message no matter whether via the MCCH notification mechanism or by periodically monitoring MCCH, the UE can be aware of Session Start of the new MBMS service by acquiring the MCCH message of the concerned MBSFN area at each modification period. Therefore, requesting a UE interested in reception of a new MBMS service to always monitor an MCCH notification is not appropriate. In other words, if the MBSFN area which broadcasts the new MBMS service is among the MBSFN areas in which the UE is receiving the MBMS services, it is unnecessary for the UE to monitor the MCCH notification, and it is only a waste of UE power. Thus, there is a need for improvement.

SUMMARY OF THE INVENTION

It is therefore an objective of the present invention to provide a method and apparatus for MCCH acquisition in a wireless communication system.

The present invention discloses a method for Multicast Control Channel (MCCH) acquisition in a User Equipment (UE) of a wireless communication system. The method includes steps of receiving at least one Multimedia Broadcast Multicast Service (MBMS) services, expressing interest in reception of a new MBMS service, and deciding whether to monitor an MCCH notification according to whether the MBMS Single Frequency Network (MBSFN) area which broadcasts the new MBMS service is among the MBSFN areas in which the UE is receiving the at least one MBMS services.

The present invention further discloses a communication device for acquiring Multicast Control Channel (MCCH) in a User Equipment (UE) of a wireless communication system. The communication device includes a processor for executing a program, and a memory coupled to the processor for storing the program. The program includes steps of receiving at least one Multimedia Broadcast Multicast Service (MBMS) services, expressing interest in reception of a new MBMS service, and deciding whether to monitor an MCCH notification according to whether the MBMS Single Frequency Network (MBSFN) area which broadcasts the new MBMS service is among the MBSFN areas in which the UE is receiving the at least one MBMS services.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
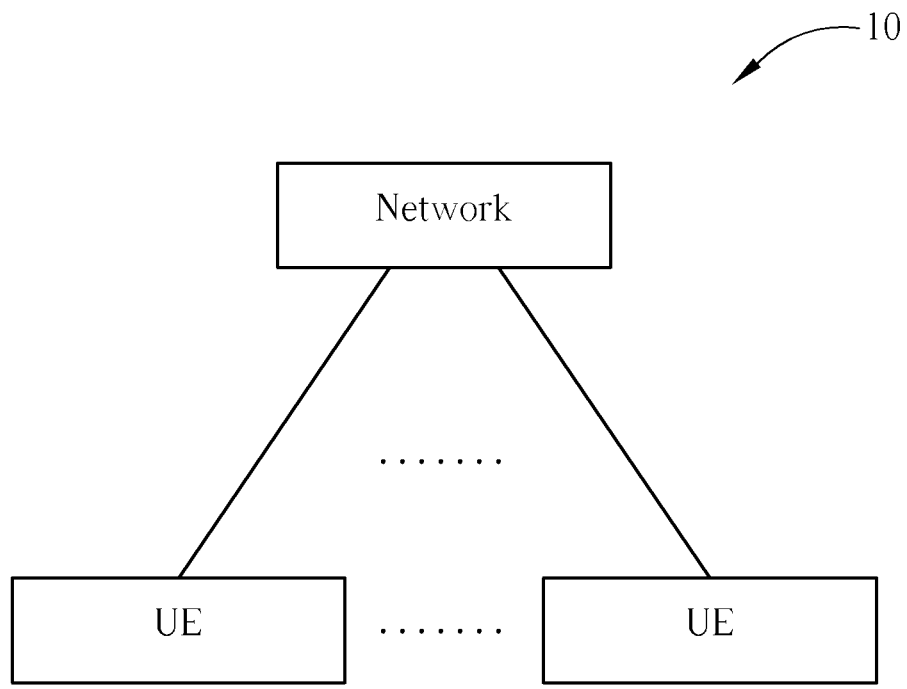
FIG. 1 is a schematic diagram of a wireless communications system.

Please refer to FIG. 1, which is a schematic diagram of a wireless communications system 10. The wireless communications system 10 is preferred to be an LTE-advanced (LTE-A) system, and is briefly composed of a network and a plurality of user equipments (UEs). In FIG. 1, the network and the UEs are simply utilized for illustrating the structure of the wireless communications system 10. Practically, the network may comprise a plurality of base stations (Node Bs), radio network controllers and so on according to actual demands, and the UEs can be devices such as mobile phones, computer systems, etc.

Figure 2:
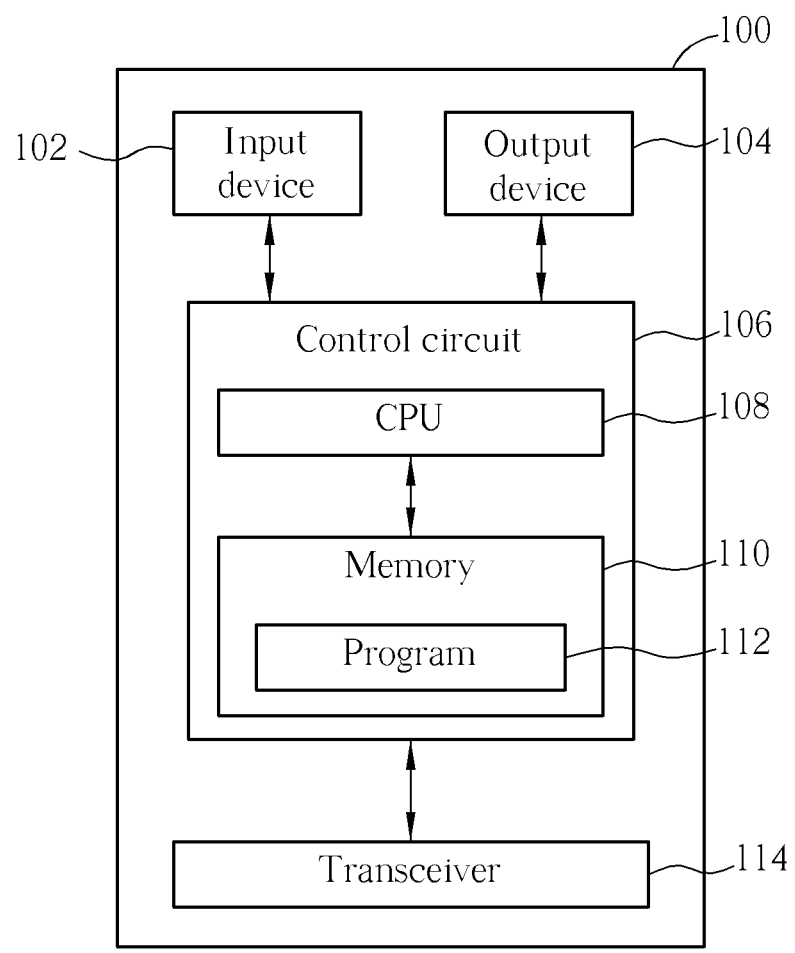
FIG. 2 is a function block diagram of a wireless communications device.

Please refer to FIG. 2, which is a functional block diagram of a communications device 100 in a wireless communications system. The communications device 100 can be utilized for realizing the UE in FIG. 1. For the sake of brevity, FIG. 2 only shows an input device 102, an output device 104, a control circuit 106, a central processing unit (CPU) 108, a memory 110, a program 112, and a transceiver unit 114 of the communications device 100. In the communications device 100, the control circuit 106 executes the program code 112 in the memory 110 through the CPU 108, thereby controlling an operation of the communications device 100. The communications device 100 can receive signals inputted by a user through the input device 102, such as a keyboard, and can output images and sounds through the output device 104, such as a monitor or speakers. The transceiver unit 114 is used to receive and transmit wireless signals, for delivering received signals to the control circuit 106, and outputting signals generated by the control circuit 106 wirelessly. From a perspective of a communications protocol framework, the transceiver unit 114 can be seen as a portion of Layer 1, and the control circuit 106 can be utilized to realize functions of Layer 2 and Layer 3.

Figure 3:
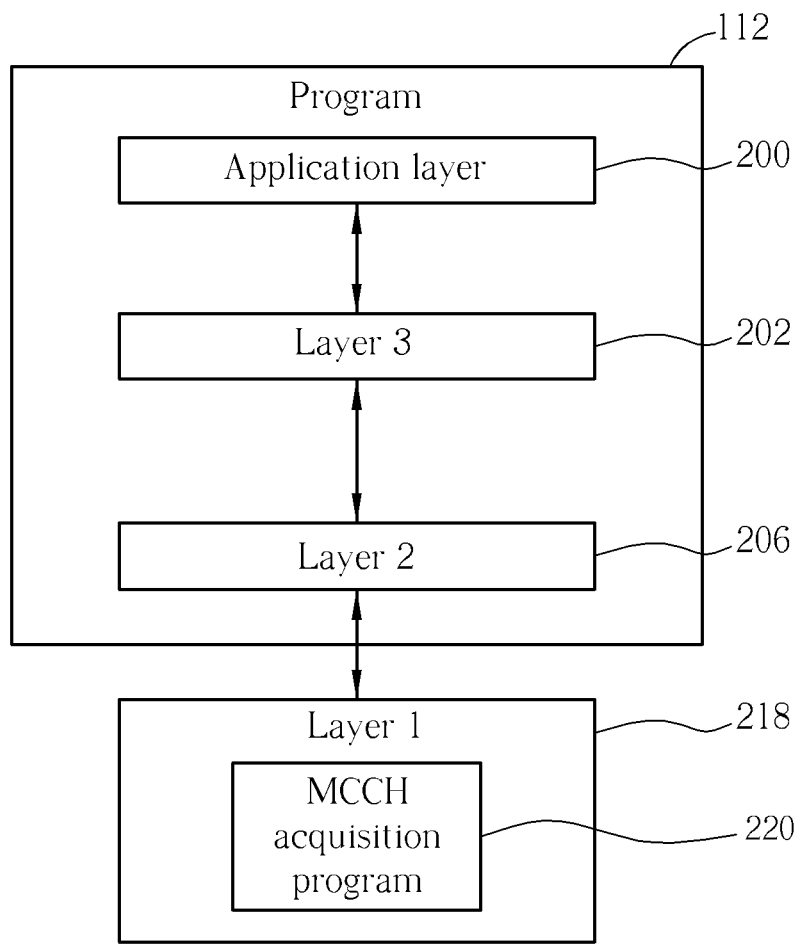
FIG. 3 is a schematic diagram of a program code of FIG. 2.

Please continue to refer to FIG. 3. FIG. 3 is a schematic diagram of the program 112 shown in FIG. 2. The program 112 includes an application layer 200, a Layer 3 202, and a Layer 2 206, and is coupled to a Layer 1 218. The Layer 3 202 performs radio resource control. The Layer 2 206 comprises a Radio Link Control (RLC) layer and a Medium Access Control (MAC) layer, and performs link control. The Layer 1 218 performs physical connections.

The wireless communication system 10 can provide an enhanced Multimedia Broadcast Multicast Service (eMBMS), to support high quality streaming multimedia and real-time MBMS services. In the conventional eMBMS, a UE must monitor an MCCH notification when expressing interest in reception of a new MBMS service, which may cause unnecessary power consumption in UE. In order to save power, the UE should decide whether to monitor an MCCH notification according to whether the MBSFN area which broadcasts a new MBMS service is among the MBSFN areas in which the UE is receiving the MBMS services.

Figure 4:
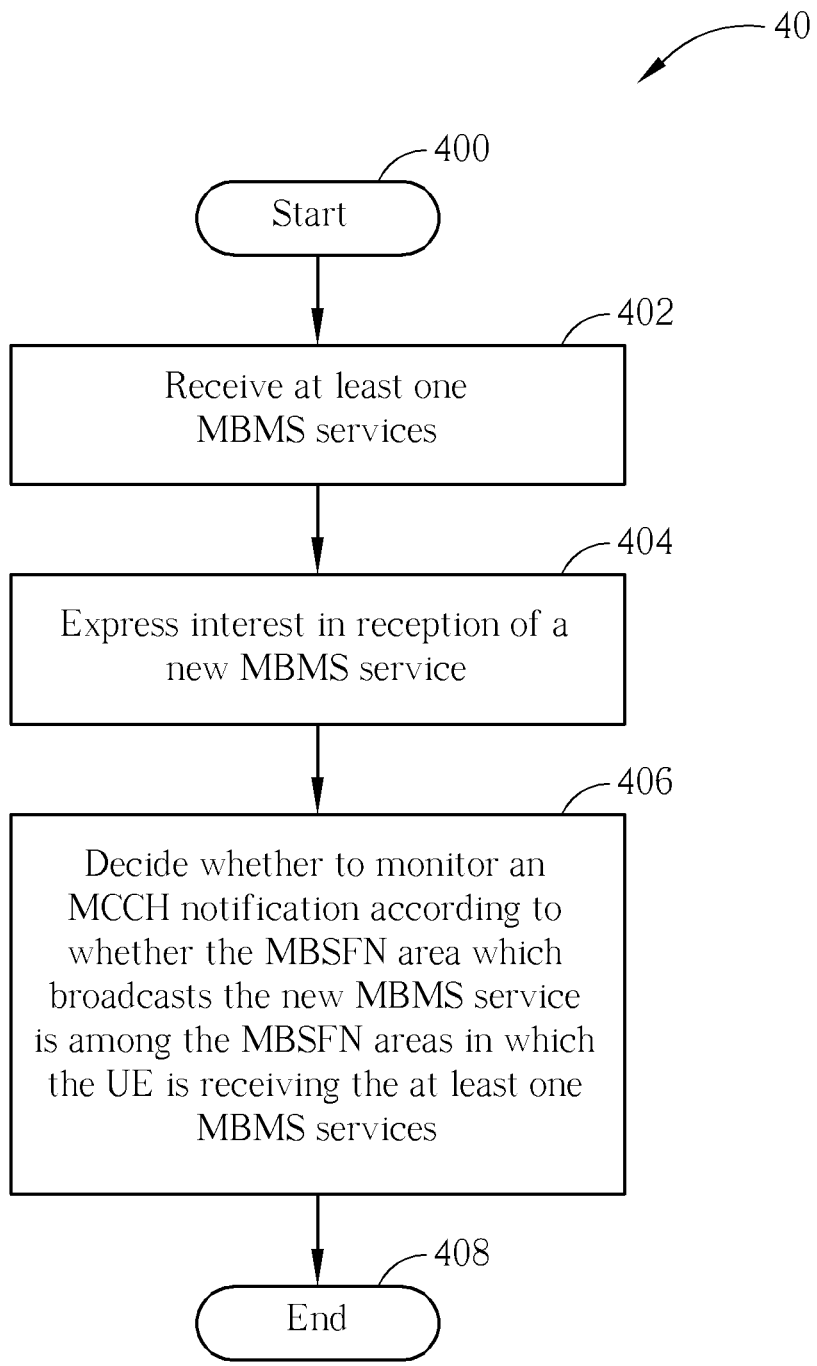
FIG. 4 is a schematic diagram of a process according to an embodiment of the present invention.

In such a situation, the embodiment of the present invention provides an MCCH acquisition program 220 in the layer 1 218, for deciding whether to monitor an MCCH notification according to whether the MBSFN area which broadcasts a new MBMS service is among the MBSFN areas in which the UE is receiving the MBMS services. Please refer to FIG. 4, which is a schematic diagram of a process 40 according to an embodiment of the present invention. The process 40 is utilized for deciding whether to monitor an MCCH notification in a UE of a wireless communication system, and can be compiled into the MCCH acquisition program 220. The process 40 includes the following steps:

Step 400: Start.

Step 402: Receive at least one MBMS services.

Step 404: Express interest in reception of a new MBMS service.

Step 406: Decide whether to monitor an MCCH notification according to whether the MBSFN area which broadcasts the new MBMS service is among the MBSFN areas in which the UE is receiving the at least one MBMS services.

Step 408: End.

Generally, a UE can know the MBSFN area where an MBMS service is broadcast according to information delivered via upper layers above the Radio Resource Control (RRC) layer by a network terminal of the wireless communication system. For example, the network terminal may deliver the information about the MBSFN area where an MBMS service is broadcast to the UE via a Service announcement procedure in the upper layers. Therefore, according to the process 40, when the UE expresses interest in reception of a new MBMS service, the UE can decide whether to monitor an MCCH notification according to whether the MBMS area which broadcasts the new MBMS service is among the MBSFN areas in which the UE is receiving the MBMS services. Meanwhile, timing for the MCCH notification transmission is based on paging occasion or special M-RNTI occasion.

In such a situation, if the MBSFN area which broadcasts the new MBMS service is not among the MBSFN areas in which the UE is receiving the MBMS services, the UE needs to monitor the MCCH notification to be aware of Session Start of the new MBMS service, and acquires the MCCH message with control information of the new MBMS service at a next modification period, so as to start receiving the new MBMS service. On the other hand, if the MBSFN area which broadcasts the new MBMS service is among the MBSFN areas in which the UE is receiving the MBMS services, the UE can be aware of Session Start and control information of the new MBMS service by acquiring MCCH message at each modification period and then start receiving the new MBMS service. Thus, the UE does not need to monitor the MCCH notification so as to save power.

In the prior art, if a UE expresses interest in reception of a new MBMS service, the UE is required to monitor an MCCH notification, which may cause unnecessary power consumption. In comparison, in the present invention, a UE does not need to monitor the MCCH notification if the MBSFN area which broadcasts the new MBMS service is among the MBSFN areas in which the UE is receiving the MBMS services, so as to save power consumption.

Noticeably, the above realization of the steps in the processes 40 should be well known by those skilled in the art. For example, the steps of the processes 40 can be compiled as units into the MCCH acquisition program 220 by instructions, parameters, variables, etc. of specific programming languages.

To sum up, in the present invention, the UE can decide whether to monitor an MCCH notification according to whether the MBSFN area which broadcasts a new MBMS service is among the MBSFN areas in which the UE is receiving the MBMS services so as to save power.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for Multicast Control Channel (MCCH) acquisition in a User Equipment (UE) of a wireless communication system, the method comprising:
   receiving a Multimedia Broadcast Multicast Service (MBMS) service in a first MBMS Single Frequency Network (MBSFN) area;
   acquiring an MCCH message corresponding to the first MBSFN area at each modification period of the MCCH, wherein the MCCH message includes control information of MBMS services;
   expressing interest in reception of a new MBMS service in a second MBSFN area; and
   monitoring an MCCH notification if the second MBSFN area is different from the first MBSFN area and not monitoring the MCCH notification if the second MBSFN area is the same as the first MBSFN area, wherein the MCCH notification is used to announce changes in MCCH messages.

2. The method of claim 1, wherein the MCCH notification is used to announce changes of MCCH due to a Session Start.

3. The method of claim 2 further comprising acquiring a corresponding MCCH at the next modification period after receiving the MCCH notification.

4. The method of claim 1, wherein the MCCH notification is not used to announce changes of MCCH due to a Session Stop.

5. The method of claim 1, wherein information about the MBSFN area where an MBMS service is broadcast is delivered to the UE via upper layers above Radio Resource Control (RRC) layer by a network terminal of the wireless communication system.

6. The method of claim 5, wherein the information about the MBSFN area where an MBMS service is broadcast is delivered to the UE via a Service announcement procedure by the network terminal.

7. The method of claim 1, wherein each MBSFN area has an MCCH.

8. The method of claim 1, wherein a MCCH message of an MBSFN area remains the same during a modification period.

9. The method of claim 1, wherein the MCCH notification is transmitted with a Physical Downlink Control Channel (PDCCH) addressed to an MBMS radio network temporary identifier (M-RNTI).

10. The method of claim 9, wherein timing for the MCCH notification transmission is based on paging occasion.

11. The method of claim 9, wherein timing for the MCCH notification transmission is based on special M-RNTI occasion.

12. A communication device for acquiring Multicast Control Channel (MCCH) in a User Equipment (UE) of a wireless communication system, the communication device comprising:
   a processor for executing a program; and
   a memory coupled to the processor for storing the program;
   wherein the program comprises:
      receiving a Multimedia Broadcast Multicast Service (MBMS) service in a first MBMS Single Frequency Network (MBSFN) area;
      acquiring an MCCH message corresponding to the first MBSFN area at each modification period of the MCCH, wherein the MCCH message includes control information of MBMS services;
      expressing interest in reception of a new MBMS service in a second MBSFN area; and
      monitoring an MCCH notification if the second MBSFN area is different from the first MBSFN area and not monitoring the MCCH notification if the second MBSFN area is the same as the first MBSFN, wherein the MCCH notification is used to announce changes in MCCH messages.

13. The communication device of claim 12, wherein the MCCH notification is used to announce changes of MCCH due to a Session Start.

14. The communication device of claim 13, wherein the program further comprises acquiring a corresponding MCCH at the next modification period after receiving the MCCH notification.

15. The communication device of claim 12, wherein the MCCH notification is not used to announce changes of MCCH due to a Session Stop.

16. The communication device of claim 12, wherein information about the MBSFN area where an MBMS service is broadcast is delivered to the UE via upper layers above Radio Resource Control (RRC) layer by a network terminal of the wireless communication system.

17. The communication device of claim 16, wherein the information about the MBSFN area where an MBMS service is broadcast is delivered to the UE via a Service announcement procedure by the network terminal.

18. The communication device of claim 12, wherein each MBSFN area has an MCCH.

19. The communication device of claim 12, wherein a MCCH message of an MBSFN area remains the same during a modification period.

20. The communication device of claim 12, wherein the MCCH notification is transmitted with a Physical Downlink Control Channel (PDCCH) addressed to an MBMS radio network temporary identifier (M-RNTI).

21. The communication device of claim 20, wherein timing for the MCCH notification transmission is based on paging occasion.

22. The communication device of claim 20, wherein timing for the MCCH notification transmission is based on special M-RNTI occasion.

* * * * *